United States Patent
Kropfeld

(10) Patent No.: US 6,896,320 B2
(45) Date of Patent: May 24, 2005

(54) REINFORCED STRUCTURAL BODY

(75) Inventor: Scott Kropfeld, Lapeer, MI (US)

(73) Assignee: Dow Global Technologies Inc., Midland, MI (US)

( * ) Notice: Subject to any disclaimer, the term of this patent is extended or adjusted under 35 U.S.C. 154(b) by 60 days.

(21) Appl. No.: 10/342,915

(22) Filed: Jan. 15, 2003

(65) Prior Publication Data

US 2003/0137162 A1 Jul. 24, 2003

Related U.S. Application Data

(60) Provisional application No. 60/351,088, filed on Jan. 22, 2002.

(51) Int. Cl.⁷ .................................................. B60J 7/00
(52) U.S. Cl. .............................. 296/203.01; 296/146.6; 296/205; 296/203.02; 296/203.03
(58) Field of Search ........................ 296/203.01, 146.6, 296/205, 203.03, 204, 187.12, 203.02; 29/530, 897.2; 428/119, 120, 71, 102, 223, 36.5, 316.6, 318.4, 319.3, 902; 52/735.1, 309.7; 264/258, 257

(56) References Cited

U.S. PATENT DOCUMENTS

| | | | |
|---|---|---|---|
| 2,866,744 A | 12/1958 | Askey et al. ................ 208/65 |
| 3,755,212 A | 8/1973 | Dunlap et al. ........ 260/2.5 BD |
| 3,821,130 A | 6/1974 | Barron et al. ........ 260/2.5 BD |
| 3,849,146 A | 11/1974 | Walters et al. ............... 96/107 |
| 4,017,117 A | * 4/1977 | Eggert, Jr. .............. 296/146.6 |
| 4,390,645 A | 6/1983 | Hoffman et al. ........... 521/137 |
| 4,451,518 A | * 5/1984 | Miura et al. ............. 296/146.6 |
| 5,076,632 A | * 12/1991 | Surratt ...................... 296/205 |
| 5,102,188 A | * 4/1992 | Yamane ..................... 296/205 |
| 5,194,199 A | 3/1993 | Thum ....................... 264/46.6 |
| 5,213,391 A | * 5/1993 | Takagi ....................... 296/205 |
| 5,218,792 A | * 6/1993 | Cooper .................. 296/203.03 |
| 5,266,133 A | 11/1993 | Hanley et al. ................ 156/71 |
| 5,344,208 A | 9/1994 | Bien et al. .................. 296/187 |
| 5,506,025 A | 4/1996 | Otto et al. ..................... 428/98 |

(Continued)

FOREIGN PATENT DOCUMENTS

| | | | |
|---|---|---|---|
| DE | 10163253 A1 | 12/2001 | .......... C08L/63/00 |
| EP | 0 827 473 B1 | 11/1996 | .......... B62D/25/04 |
| EP | 0 897 439 B1 | 11/1997 | ............ E04C/3/29 |
| EP | 0 899 300 A2 | 8/1998 | .......... C08L/63/00 |
| EP | 1 020 273 A1 | 7/2000 | .......... B29C/39/02 |

(Continued)

OTHER PUBLICATIONS

JP 59077973 Patent Abstracts of Japan EPO.
JP 2000158471 Patent Abstract of Japan EPO.

(Continued)

*Primary Examiner*—Kiran Patel

(57) ABSTRACT

The present invention describes a hollow structural body such as an automotive unibody or frame rail that is reinforced with a reinforcing material such as a polyurethane foam by inserting into a portion of the structural body a bulkhead-containing insert, which, in combination with the structural body at the place of insertion, creates a containment region for the reinforcing material. Uncured reinforcing material can then be added to the containment region and cured.

The present invention solves a problem in the art by providing structural reinforcement to be easily and precisely placed within the structural body to provide, for example, enhanced crash resistance or improvements in acoustical properties.

15 Claims, 1 Drawing Sheet

U.S. PATENT DOCUMENTS

| | | | | |
|---|---|---|---|---|
| 5,533,781 A | * | 7/1996 | Williams | 296/204 |
| 5,545,361 A | | 8/1996 | Rosasco | 264/45.2 |
| 5,609,385 A | * | 3/1997 | Daniel et al. | 296/203.01 |
| 5,648,401 A | | 7/1997 | Czaplicki et al. | 521/85 |
| 5,660,428 A | * | 8/1997 | Catlin | 296/203.01 |
| 5,720,510 A | * | 2/1998 | Daniel et al. | 296/203.01 |
| 5,725,272 A | | 3/1998 | Jones | 296/208 |
| 5,755,486 A | * | 5/1998 | Wycech | 296/205 |
| 5,806,919 A | * | 9/1998 | Davies | 296/203.01 |
| 5,857,734 A | * | 1/1999 | Okamura et al. | 296/187.12 |
| 5,866,052 A | | 2/1999 | Muramatsu | 264/46.6 |
| 5,871,253 A | * | 2/1999 | Erber | 296/146.6 |
| 5,884,960 A | * | 3/1999 | Wycech | 296/146.6 |
| 5,888,600 A | | 3/1999 | Wycech | 426/35.9 |
| 5,968,995 A | | 10/1999 | Rizk et al. | 521/159 |
| 5,985,435 A | | 11/1999 | Czaplicki et al. | 428/323 |
| 6,003,274 A | | 12/1999 | Wycech | 52/232 |
| 6,040,350 A | | 3/2000 | Fukui | 521/135 |
| 6,050,579 A | * | 4/2000 | Selland et al. | 296/204 |
| 6,058,673 A | | 5/2000 | Wycech | 52/721.4 |
| 6,062,624 A | | 5/2000 | Crabtree et al. | 296/39.3 |
| 6,068,424 A | | 5/2000 | Wycech | 403/269 |
| 6,079,180 A | * | 6/2000 | Wycech | 296/203.01 |
| 6,092,862 A | * | 7/2000 | Kuwahara | 296/204 |
| 6,092,864 A | | 7/2000 | Wycech et al. | 296/204 |
| 6,096,403 A | | 8/2000 | Wycech | 428/122 |
| 6,099,948 A | | 8/2000 | Paver, Jr. | 428/304.4 |
| 6,131,897 A | | 10/2000 | Barz et al. | 269/207 |
| 6,135,542 A | * | 10/2000 | Emmelmann et al. | 296/203.01 |
| 6,146,566 A | | 11/2000 | Beeck et al. | 264/101 |
| 6,149,227 A | | 11/2000 | Wycech | 296/188 |
| 6,150,428 A | | 11/2000 | Hanley, IV et al. | 521/135 |
| 6,164,716 A | * | 12/2000 | Palazzolo et al. | 296/146.6 |
| 6,165,588 A | * | 12/2000 | Wycech | 296/205 |
| 6,168,226 B1 | * | 1/2001 | Wycech | 296/203.03 |
| 6,189,953 B1 | * | 2/2001 | Wycech | 296/203.03 |
| 6,196,619 B1 | * | 3/2001 | Townsend et al. | 296/146.6 |
| 6,199,940 B1 | * | 3/2001 | Hopton et al. | 296/203.01 |
| 6,218,442 B1 | | 4/2001 | Hilborn et al. | 521/85 |
| 6,233,826 B1 | | 5/2001 | Wycech | 29/897.1 |
| 6,237,304 B1 | | 5/2001 | Wycech | 52/731.6 |
| 6,247,287 B1 | | 6/2001 | Takabatake | 52/731.6 |
| 6,253,524 B1 | | 7/2001 | Hopton et al. | 52/731.2 |
| 6,270,600 B1 | | 8/2001 | Wycech | 156/79 |
| 6,272,809 B1 | * | 8/2001 | Wycech | 296/205 |
| 6,276,105 B1 | | 8/2001 | Wycech | 52/309.8 |
| 6,281,260 B1 | | 8/2001 | Hanley, IV et al. | 521/135 |
| 6,287,666 B1 | * | 9/2001 | Wycech | 296/146.6 |
| 6,296,298 B1 | | 10/2001 | Barz | 296/187 |
| 6,305,136 B1 | | 10/2001 | Hopton et al. | 52/309.7 |
| 6,311,452 B1 | | 11/2001 | Barz et al. | 52/735.1 |
| 6,332,731 B1 | | 12/2001 | Wycech | 403/171 |
| 6,346,573 B1 | | 2/2002 | White | 525/121 |
| 6,348,513 B1 | | 2/2002 | Hilborn et al. | 521/95 |
| 6,357,819 B1 | | 3/2002 | Yoshino | 296/189 |
| 6,376,564 B1 | | 4/2002 | Harrison | 521/54 |
| 6,378,933 B1 | * | 4/2002 | Schoen et al. | 296/203.02 |
| 6,387,470 B1 | | 5/2002 | Chang et al. | 428/121 |
| 6,406,078 B1 | | 6/2002 | Wycech | 293/120 |
| 6,413,611 B1 | | 7/2002 | Roberts et al. | 428/99 |
| 6,419,305 B1 | | 7/2002 | Larsen | 296/203.03 |
| 6,422,575 B1 | | 7/2002 | Czaplicki et al. | 277/628 |
| 6,423,755 B1 | | 7/2002 | Allen et al. | 521/111 |
| 6,451,231 B1 | | 9/2002 | Harrison et al. | 264/45.3 |
| 6,455,126 B1 | | 9/2002 | Wycech | 428/122 |
| 6,455,144 B1 | | 9/2002 | Wycech | 428/308.4 |
| 6,467,834 B1 | * | 10/2002 | Barz et al. | 296/203.02 |
| 6,471,285 B1 | | 10/2002 | Czaplicki et al. | 296/188 |
| 6,474,722 B2 | | 11/2002 | Barz | 296/187 |
| 6,474,723 B2 | | 11/2002 | Czaplicki et al. | 296/188 |
| 6,475,577 B1 | | 11/2002 | Hopton et al. | 428/34.7 |
| 6,478,367 B2 | * | 11/2002 | Ishikawa | 296/203.03 |
| 6,482,486 B1 | | 11/2002 | Czaplicki et al. | 428/36.91 |
| 6,494,525 B1 | | 12/2002 | Blank | 296/187 |
| 6,502,821 B2 | | 1/2003 | Schneider | 276/146.6 |
| 6,519,854 B2 | | 2/2003 | Blank | 29/897.1 |
| 6,546,693 B2 | | 4/2003 | Wycech | 52/790.1 |
| 6,550,847 B2 | | 4/2003 | Honda et al. | 296/146.6 |
| 6,561,571 B1 | | 5/2003 | Brennecke | 296/187 |
| 6,573,309 B1 | | 6/2003 | Reitenbach et al. | 521/135 |
| 6,575,309 B1 | | 6/2003 | Chiga | 210/435 |
| 6,607,238 B2 | | 8/2003 | Barz | 296/187 |
| 6,619,727 B1 | * | 9/2003 | Barz et al. | 296/203.02 |
| 6,630,221 B1 | | 10/2003 | Wong | 428/117 |
| 6,649,243 B2 | | 11/2003 | Roberts et al. | 428/99 |
| 6,668,457 B1 | | 12/2003 | Czaplicki | 29/897.1 |
| 6,739,641 B2 | | 5/2004 | McLeod et al. | 296/37.2 |
| 2002/0033617 A1 | | 3/2002 | Blank | 296/187 |
| 2002/0036338 A1 | | 3/2002 | Matsuo et al. | 257/686 |
| 2002/0053179 A1 | | 5/2002 | Wycech | 52/721.4 |
| 2002/0074083 A1 | | 6/2002 | Ludin et al. | 156/293 |
| 2002/0074827 A1 | | 6/2002 | Fitzgerald et al. | 296/188 |
| 2002/0094427 A1 | | 7/2002 | Edwards et al. | 428/297.4 |
| 2002/0096833 A1 | | 7/2002 | Czaplicki et al. | 277/316 |
| 2002/0115736 A1 | | 8/2002 | Koshy | 521/99 |
| 2002/0125739 A1 | | 9/2002 | Czaplicki et al. | 296/187 |
| 2002/0148198 A1 | | 10/2002 | Wycech | 52/790.1 |
| 2002/0164450 A1 | | 11/2002 | Lupini et al. | 428/99 |
| 2002/0174954 A1 | | 11/2002 | Busseuil et al. | 156/349 |
| 2002/0178584 A1 | | 12/2002 | Wyech | 29/897.2 |
| 2002/0192387 A1 | | 12/2002 | Agarwal et al. | 427/407.1 |
| 2003/0001410 A1 | | 1/2003 | Cate et al. | 296/187 |
| 2003/0001469 A1 | | 1/2003 | Hankins et al. | 312/257.1 |
| 2003/0018095 A1 | | 1/2003 | Agarwal | 521/59 |
| 2003/0099826 A1 | * | 5/2003 | Juras et al. | 428/343 |
| 2003/0102686 A1 | * | 6/2003 | McLeod et al. | 296/37.2 |
| 2003/0102687 A1 | * | 6/2003 | Mcleod et al. | 296/37.2 |
| 2003/0127844 A1 | * | 7/2003 | Gloceri et al. | 280/788 |
| 2003/0184121 A1 | * | 10/2003 | Czaplicki et al. | 296/187.02 |
| 2003/0209921 A1 | * | 11/2003 | Coon et al. | 296/187.02 |

FOREIGN PATENT DOCUMENTS

| | | | |
|---|---|---|---|
| EP | 1 364 862 A2 | 4/2003 | B62D/29/00 |
| JP | 01 069308 | 3/1989 | |
| WO | 99/08854 | 2/1999 | B29C/44/06 |
| WO | 00/13876 | 3/2000 | B29C/47/00 |
| WO | 00/27920 | 5/2000 | C08L/63/00 |
| WO | 00/55444 | 9/2000 | E04C/2/10 |
| WO | 01/34453 A1 | 5/2001 | B62D/29/00 |
| WO | 01/41950 A3 | 6/2001 | B21D/26/00 |
| WO | 01/41950 A2 | 6/2001 | B21D/26/00 |
| WO | 01/549936 A1 | 8/2001 | B60J/7/00 |
| WO | 01/41950 A2 | 12/2001 | B21D/26/00 |
| WO | 02/12026 A1 | 2/2002 | B60R/13/08 |
| WO | 02/24451 A1 | 3/2002 | B32B/27/38 |
| WO | 02/26549 A1 | 4/2002 | B62D/29/00 |
| WO | 02/26550 A1 | 4/2002 | B62D/29/00 |
| WO | 02/31077 A2 | 4/2002 | C09J/163/00 |
| WO | 02/31077 A3 | 4/2002 | C09J/163/00 |
| WO | 02/49836 A1 | 6/2002 | B32B/5/22 |
| WO | 02/087843 A1 | 11/2002 | B29C/44/12 |
| WO | 02/088214 | 11/2002 | C08G/18/58 |

OTHER PUBLICATIONS

JP 20002308147 Patet Abstract of Japan EPO.
Derwent 2002–449608, JP 2002127938.
Derwent 2003–124835, JP2002362412.
Derwent 2000–340652, EP 999119A2.
U.S. Appl. No. 10/794,909, Michelle Boven et al., filed Mar. 5, 2004, Structural Reinforcement Article and Process for Preparation Thereof.

* cited by examiner

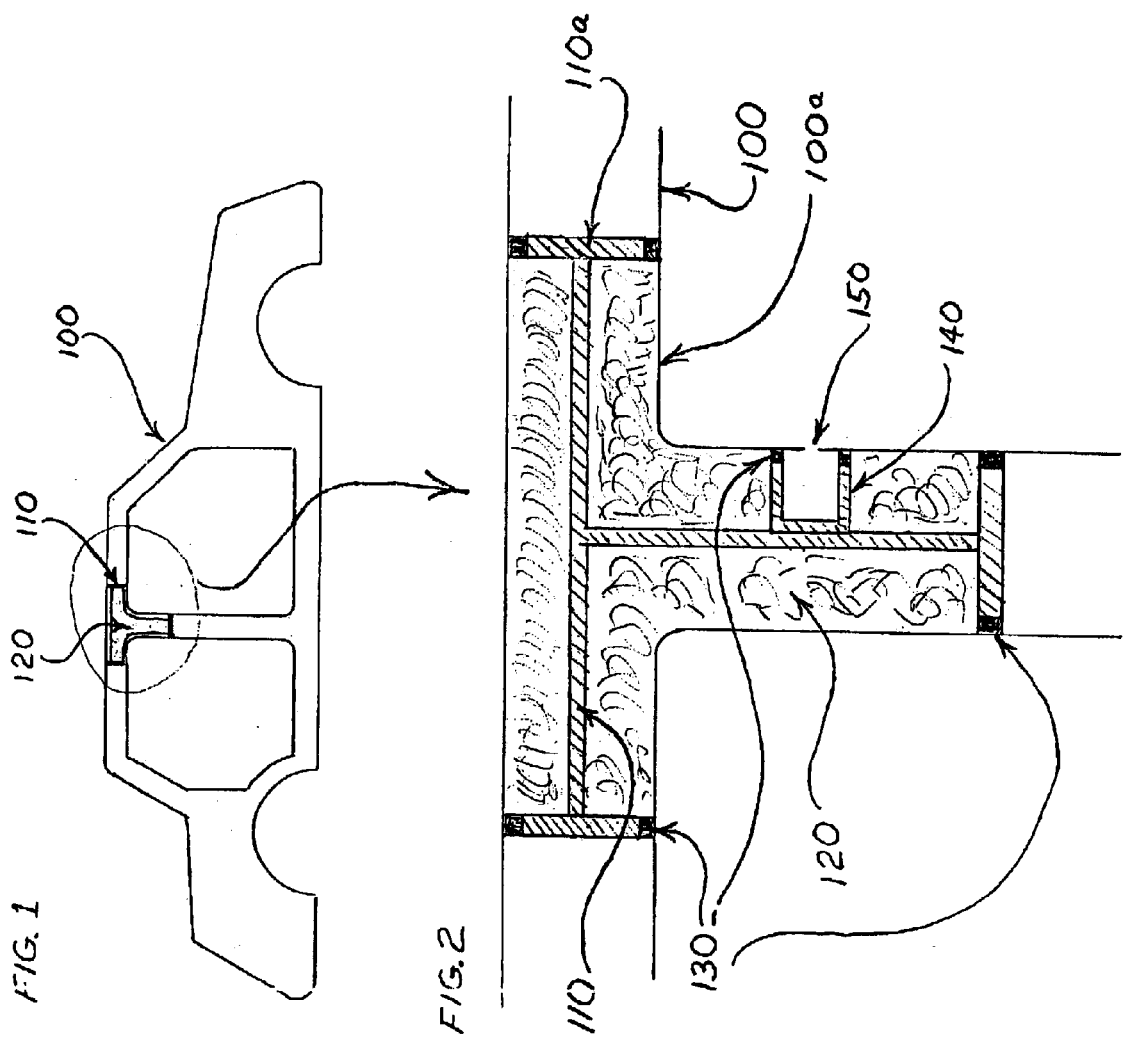

REINFORCED STRUCTURAL BODY

CROSS-REFERENCE STATEMENT

This application claims the benefit of U.S. Provisional Application No. 60/351,088, filed Jan. 22, 2002.

FIELD OF THE INVENTION

The invention relates to a structural body containing a structural reinforcing material. In particular the invention relates to reinforced structural, sealing, and acoustical vehicular bodies such as reinforced frame rails and unibodies.

BACKGROUND OF THE INVENTION

A hollow member (structural body) of a vehicle is often filled with foam to seal, dampen noise, and to impart structural strength and rigidity or acoustical properties. Typically, a structural body is filled with a foam such as polyurethane by introducing fluid reactants into a region that it is desired to reinforce (that is, a reinforcing region) and allowing the foam to react and fill the reinforcing region. Unfortunately, this method is uncontrolled and the foam inconsistently fills the cavity from one vehicle to the next. The method, in many instances, also requires the use of specialized plugs to keep the foam from escaping and clogging up functional holes such as mounting holes for other components.

U.S. Pat. Nos. 5,194,199, 5,866,052 and 6,062,624 disclose yet another way of reinforcing structural bodies by inserting a pre-formed cured structural foam part into the structural body However, this approach relies on the use of an expandable polyurethane or epoxy resin to adhere the structural part into place, which resin detracts from the overall structural performance of the part. Furthermore, the integrity of the structural part-structural body bond can be compromised due to the inconsistency of the bake ovens used to cure the adhesive. Accordingly, it would be desirable to provide a structural reinforcement to be precisely placed within a structural body that is not subject to the deficiencies of a sealant or that relies upon consistencies of bake oven temperatures.

SUMMARY OF THE INVENTION

The present invention solves a problem in the art by providing a method for reinforcing a structural body having a cavity comprising the steps of a) inserting into a portion of the cavity of the structural body a bulkhead-containing insert which, in combination with the structural body at the place of insertion, forms a containment region for a reinforcing material, which containment region has an inlet; b) sealing the insert to the structural body; c) adding through the inlet of the reinforcing region a sufficient quantity of an uncured reinforcing material to at least partially fill the containment region; and d) curing the reinforcing material.

In a second aspect the present invention is a reinforced structural body comprising a) a structural body having a cavity b) a bulkhead-containing insert disposed and sealed within the cavity, which insert, in combination with the structural body at the place of insertion, defines a reinforcing region that is at least partially filled with an uncured reinforcing material.

In a third aspect the present invention is a reinforced structural body comprising a) a structural body having a cavity b) a bulkhead-containing insert disposed and sealed within the cavity, which insert, in combination with the structural body at the place of insertion, defines a reinforcing region that is at least partially filled with a cured reinforcing material.

The present invention is particularly useful in reinforcing a structural body, particularly of a vehicular frame rail or unibody. For example, it is quite common for frame rails of automobiles to have sections that are weakened to create crush zones to dissipate the energy of an accident and protect the occupants. The frame rails also support parts of the automobile such as the transmission. The present invention provides a way for a reinforcing material to be introduced selectively into a portion of the frame rail without compromising the crush zone or clogging the mounting holes for other components such as engines and transmission. The present invention may also be used to reinforce other components of a vehicle such as rocker panels, beams, pillars, crossbars, body mounts and the like. Furthermore, the present invention may be used for non-vehicular applications such as athletic equipment (for example, golf clubs), boats, bicycles, aircraft, trucks and trains.

BRIEF DESCRIPTION OF THE DRAWINGS

FIG. 1 is a perspective view of an automotive unibody fitted with a reinforcing part.

FIG. 2 is an enlarged cutaway view of the reinforcing part depicted in FIG. 1.

DETAILED DESCRIPTION OF THE INVENTION

FIG. 1 illustrates an example of a preferred embodiment of the present invention. Structural body 100 is in the form of an automotive unibody for illustrative purposes. Inserted and positioned within a portion of the cavity of the unibody 100 using, for example, mounting tabs, clips, screws, rivets, alignment pins, welds, or glue, is a bulkhead-containing insert 110 that is placed in the region to be reinforced. The insert 110, in combination with a portion of the inner wall of the structural body at the place of insertion 10a, confines subsequently injected reinforcing material to the region defined by the insert and the portion of the structural body at the place of insertion. Thus, the insert 110, by itself, is not a container, but rather forms a reinforcing region for subsequently introduced reinforcing material in combination with the structural body by virtue of the presence of a) at least one bulkhead 110a associated with the insert and b) the inner wall of the structural body 10a within the confines of the at least one bulkhead 110a. (An insert with a single bulkhead may be appropriate where the place of insertion includes a pre-existing bulkhead.)

The reinforcing region is at least partially filled, more preferably substantially completely filled, with a reinforcing material 120, which is preferably a 2-part expandable foam such as an expandable polyurethane or an expandable epoxy resin.

Turning now to FIG. 2, which is an enlarged cutaway view of the insert 110 within a portion of the unibody 100, the insert 110 is advantageously sealed to the unibody with a sealant 130. Also depicted is a protuberance 140 extending in the direction of the reinforcing material 120. The protuberance 140, which can be made by any suitable method such as surface deforming or capping a hole, protects an opening 150, typically a mounting hole or access hole, from being clogged with reinforcing material 120.

The structural body 100 can be made using any suitable material, the selection of which is application dependent.

For example, for a frame rail or other tubular structural member of an automobile, the structural body is advantageously formed of metal such as steel or aluminum or alloys thereof. Other suitable materials may be plastics, wood, ceramics, composites, glass and other materials rigid enough to form the structural body.

The insert 110 may be fabricated using any suitable material such as those used to make the structural body 100, although the insert 110 and structural body 100 need not be made with the same materials. For example, if the structural body 100 is a steel unibody, the insert 110 is preferably a plastic or filler reinforced plastic that can withstand the temperatures and stresses associated with manufacturing an automobile. Examples of suitable plastics for such an application include nylon, polycarbonates, polystyrenes, polyolefins such as polyethylene and poly propylene, a thermosetting resin such as phenol-formaldehyde, phenol furfural, polyurethanes, and epoxy resins. Preferably the plastic is a filler reinforced thermoplastic material such as a glass reinforced nylon, commercially available as VYDYNE® reinforced nylon, (a trademark of The Dow Chemical Company). Preferably the glass reinforced nylon has a volume to volume glass content of from 10% to 40%.

The sealant 130 is preferably a low density heat expandable epoxy sealer such as BETABRACE® epoxy resin (a trademark of The Dow Chemical Company). However, sealing can also be accomplished by using a non-expanding sealer. Moreover, sealing can also be accomplished mechanically, for example, by using an elastomeric insert that conforms closely to the contours of the unibody at the place of installation.

The reinforcing material 120 may be any material that enhances structural or acoustical properties of the structural body 100. Examples of preferred materials include foams such as expanded polyurethane and expanded epoxy resin. Preferably, the reinforcing material 120 is a polyurethane foam formed by a suitable method such as those known in the art. For example, the polyurethane foam may be made by any of the methods described in U.S. Pat. Nos. 4,390,645; 2,866,744; 3,755,212; 3,849,146; 3,821,130 and 5,968,995, which descriptions are incorporated herein by reference.

A preferred method of preparing a reinforced structural body includes the steps of inserting into a portion of the cavity of the structural body and affixing thereto a bulkhead-containing insert which, in combination with the structural body at the place of insertion, creates a reinforcing region. For the purposes of this invention, a reinforcing region is a cavity that defines the region that it is desired to reinforce.

The affixed insert is then heat sealed to the structural body to confine the reinforcing material within the reinforcing region. The reinforcing material, preferably an uncured 2-part polyurethane resin, is then added to the reinforcing region through an inlet, which can either be pre-existing or created, to at least partially fill, more preferably to substantially completely fill the reinforcing region. The reinforcing material is then cured, preferably chemically or by heating, more preferably chemically.

The insert may be prepared by a variety of techniques including injection molding, blow molding, and stamping, with injection molding being preferred. The insert is preferably injection molded into opposing and connectable halves that are snapped together and then affixed into the structural body.

The following example is for illustrative purposes only and is not intended to limit the scope of the invention.

EXAMPLES

Example 1

A VYDYNE 30% volume-to-volume glass filled nylon 66 insert is inserted and held mechanically into a first frame rail half with a clip using a locating hole in the first frame rail half. The insert, which is coated with a 2-mm coating BETABRACE 85076 expandable epoxy foam adhesive, is designed to maximize the amount of foam that contacts the frame rail directly.

A second frame rail half is then welded to the first frame rail half. The welded frame rail is then e-coated and the e-coat liquids flow freely through all the cavities within frame rail. The welded frame rail is then baked to a temperature sufficient to cure the e-coating and to seal the insert together with the frame rail by way of the concomitantly cured resin.

BETAFOAM 88100 isocyanate and BETAFOAM 88124 resin are injected into the inner cavity and allowed to cure forming a frame rail having reinforcing solely within the confines of the insert and the portion of the frame to which it is inserted.

What is claimed is:

1. A reinforced structural body comprising a) a structural body having a cavity b) a bulkhead-containing insert disposed and sealed within the cavity, which insert, in combination with the structural body at the place of insertion, defines a reinforcing region that is at least partially filled with an uncured reinforcing material and one or more protuberances is extending in the direction of the reinforcing material wherein one or more of the protuberances protects an opening in the structural body from becoming clogged with reinforcing material.

2. The reinforced structural body of claim 1 wherein the structural body is an automotive frame rail or unibody.

3. The reinforced structural body of claim 1 wherein the reinforcing material is an expandable 2-part polyurethane or an expandable 2-part epoxy resin.

4. The reinforced structural body of claim 1 wherein the reinforcing material is an expandable 2-part polyurethane.

5. The reinforced structural body of claim 4 which is sealed by way of an expanded epoxy adhesive or a silicone or acrylic adhesive or by mechanical means.

6. The reinforced structural body of claim 4 which is sealed by way of an expanded epoxy adhesive.

7. The reinforced structural body of claim 6 wherein the reinforcing material substantially fills the reinforcing region.

8. The reinforced structural body of claim 7 wherein the insert is a filler reinforced thermoplastic.

9. The reinforced structural body of claim 7 wherein the insert is a glass reinforced nylon.

10. The reinforced structural body of claim 1 wherein the insert includes a protuberance projecting in the direction of the uncured reinforcing material.

11. The reinforced structural figure body of claim 1 wherein one or more of the protuberances are sealed to the structural body.

12. A reinforced structural body comprising a) a structural body having a cavity b) a bulkhead-containing insert disposed and sealed within the cavity, which insert, in combination with the structural body at the place of insertion, defines a reinforcing region that is at least partially filled with a cured reinforcing material and one or more protuberances is extending in the direction of the reinforcing material wherein one or more of the protuberances protects an opening in the structural body from becoming donned with reinforcing material.

13. The reinforced structural body of claim 12 wherein the structural body is an automotive frame rail or unibody.

14. The reinforced structural body of claim 12 wherein the reinforcing material is an expanded 2-part polyurethane.

15. The reinforced structural figure body of claim 12 wherein one or more of the protuberances are sealed to the structural body.

* * * * *